United States Patent Office 2,919,394
Patented Dec. 29, 1959

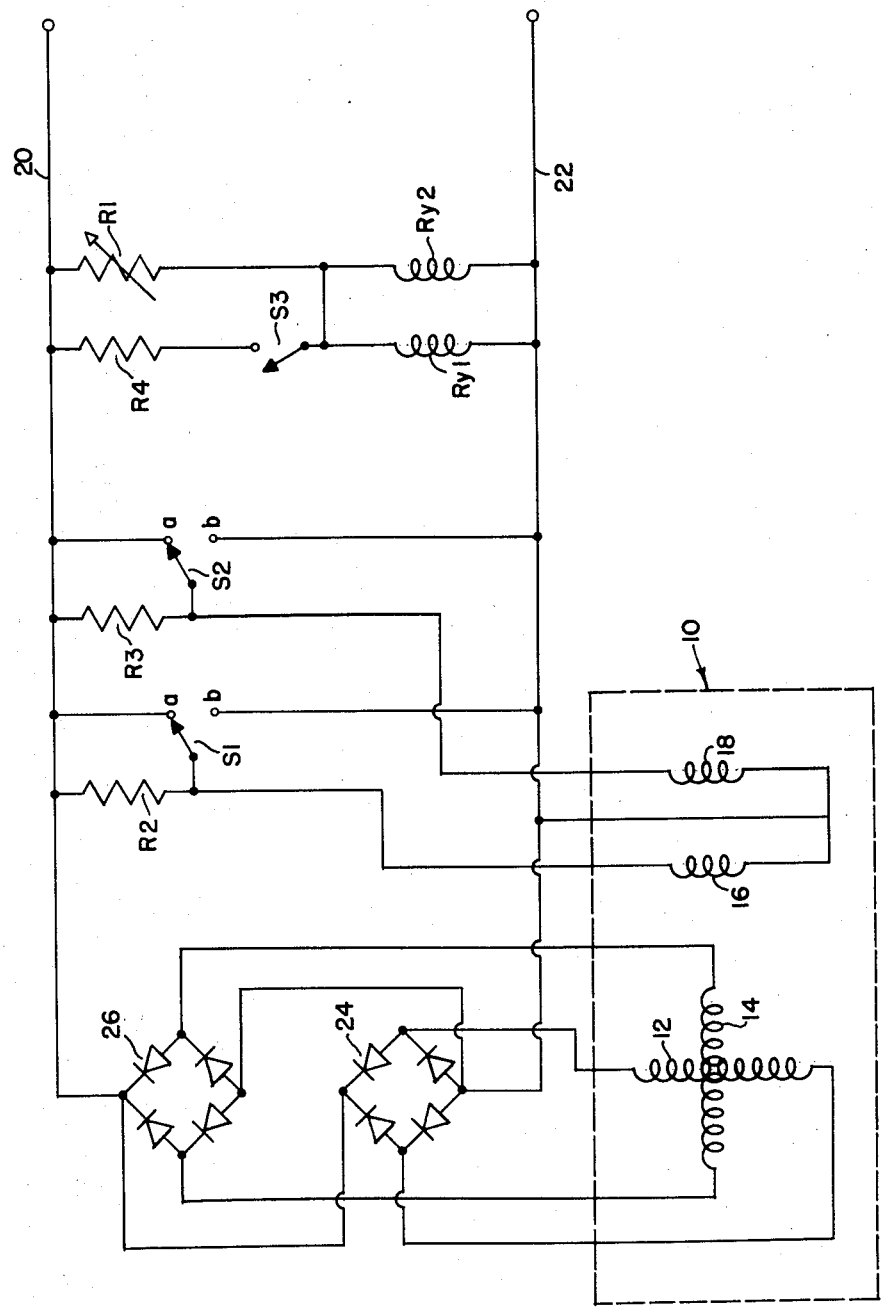
RUDOLPH A. VERCELLA
INVENTOR
By BLAIR & SPENCER
ATTORNEYS

2,919,394

POWER DISSIPATION LIMITING CIRCUIT FOR ELECTRICAL GENERATING SYSTEMS

Rudolph A. Vercella, New Haven, Conn., assignor, by mesne assignments, to Safety Electrical Equipment Corporation, Cincinnati, Ohio, a corporation of Ohio Application November 25, 1957, Serial No. 698,416

11 Claims. (Cl. 322—33)

This invention relates to an improved power limiting system adapted to limit output power of an electrical generating system. In particular, it is directed to a power limiting system for use with a generating system in which a voltage regulator is utilized to limit the power dissipated in an element to prevent failure from overheating.

The current in a generating system often must be limited to prevent power dissipation in an element of the system from exceeding a safe level. The heat developed in each element is roughly proportional to the square of the current through it and thus such elements as generator windings, rectifiers, etc., may burn out from excessive current. Ordinary current-interrupting devices are often used to keep the current through particular elements within safe limits. However, such devices, being responsive to the magnitude of the current, are insensitive to the actual temperatures of the elements being protected. They interrupt the circuits when harmless overloads occur, e.g. when large currents are passed for periods too short to raise temperatures of elements to excessive levels. Moreover, the safe power dissipation level depends to a large extent upon ambient temperature. If the ambient temperature is low, greater current loads may be undertaken without failure. Conventional current interrupting devices must be set at a level safe for all expected ambient temperatures, and thus they overprotect at lower temperatures.

Current limitation may also be accomplished indirectly by voltage regulation, the voltage being decreased to reduce the system current. Voltage regulators commonly control the output voltage of the generating system by regulating the field current of the generator or alternator, as the case may be, by means of interrupting contacts, carbon-pile series resistors, etc. These regulators are particularly useful in limiting the currents through elements connected across the line such as storage batteries. However, since they are insensitive to the actual cause of most component failures, temperature of the component, they are subject to the same limitations as current regulators. Some temperature compensation has been effected with voltage regulators to decrease the voltage at temperatures in excess of a certain level. Such compensators are not altogether satisfactory, however, because they switch the output voltage from one level to another, thus providing only two voltage levels, whereas to compensate satisfactorily for the temperature of the element to be protected, the output voltage should be continuously adjustable over a range of temperatures to insure protection while providing maximum output.

Accordingly, it is an object of my invention to provide an improved current limiting system for use with electrical generating systems. It is another object of my invention to provide a current limiting system of the above character which limits the power dissipation in an element of the system to a safe level. It is yet another object of my invention to provide a limiting system of the above character which responds to harmful overloads but permits harmless overloads. It is a further object of my invention to provide a limiting system of the above character with a continuously adjustable power limit appropriate for all conditions of operation. It is yet another object of my invention to provide a limiting system of the above character which compensates for variations in ambient temperature. It is a final stated object of my invention to provide a limiting system of the above character which may be incorporated into conventional generating systems with a minimum of circuit change. Other objects of my invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a schematic diagram of a direct-current generating system incorporating the power limiting system of my invention.

In general, my power limiting system may be used with any generating system having a conventionally connected voltage regulator. In series with the voltage-sensing terminals of the regulator I connect a thermally sensitive resistor in close thermal relationship with the most vulnerable element of the system, i.e. the element most likely to suffer damage from excessive current generating under the particular operating conditions encountered by the system. This resistor is so connected that as its temperature increases the proportion of the line voltage across the sensing terminals of the regulator also increases. The regulator thus sees an apparent increase in line voltage and acts to decrease the output voltage, thereby diminishing the current through the protected element to a safe level.

More particularly, as seen in the accompanying drawings, a direct-current generating system of the type often used on railway cars includes an inductor-alternator, generally indicated at 10, comprising output windings 12 and 14 and field windings 16 and 18. Alternator 10 may be conventionally formed with two pairs of pole pieces (not shown) arranged about a toothed-periphery magnetic rotor. Each of the field windings utilizes one pair of pole pieces as a mutual magnetic flux path with one of the output windings. Direct current is supplied to field windings 16 and 18 from output bus wires 20 and 22 through a voltage regulator to be described, thus setting up a magnetic field in each of these windings and its associated output winding. As the toothed rotor is rotated, the reluctance of each of the magnetic circuits is varied, with the flux linking output windings 12 and 14 thereby increasing and decreasing to develop alternating voltages at the terminals of these windings. During initial operation, prior to the appearance of generated voltage across the output bus wires, residual magnetic fields serve in place of those developed by electric currents in field windings 16 and 18.

Windings 12 and 14 of alternator 10 are connected to bridge rectifiers indicated at 24 and 26, respectively, and the direct-current outputs of the rectifiers are connected in parallel to bus wires 20 and 22.

As illustrated in the drawing, a conventional voltage regulator may be used to control the output of the generating system. Thus regulator relay coils Ry1 and Ry2 are connected in parallel with each other and in series with a variable resistor R1 across the output of the system. These coils operate movable contacts S1 and S2 adapted to engage fixed contacts S1a and S1b, and S2a and S2b, respectively. The movable contacts of the regulators are spring biased toward the "a" contacts to provide direct connections between bus 20 and field coils 16 and 18. When the voltage across a regulator coil reaches a predetermined level, as determined by the system output voltage and the setting of resistor R1, the movable contact for that coil moves away from the "a" contact, thereby inserting a resistance R2 or R3 in series with winding 16 or 18. This will cause a drop in output voltage, de-energizing the regulator coil and allowing the movable contact to return to the "a" position. Should the insertion of the resistances R2 and R3 in series with the field windings be insufficient to lower the voltage across the line to the regulated level, the relay coils Ry1 and Ry2 will not de-energize and the movable contacts S1 and S2 will continue on to the "b" positions. In these positions they short out the field windings and thereby interrupt the outputs of the respective output windings. The resulting decrease in output voltage causes the movable contacts to disengage from the "b" contacts under spring tension, the line voltage increases and the regulating cycles repeat. It will be understood that when, as illustrated in the drawing, two regulators are used to increase relay contact life, they need not operate in synchronism or even at exactly the same voltage level in order to achieve effective voltage regulation.

In order to limit the power dissipation in the various elements of the generating system to a safe level, I have connected in parallel with resistor R1 the series combination of a thermostatic switch S3 and a temperature sensitive resistor R4. Such resistors are well known in the art; they may have positive or negative thermal coefficients of resistance and, as will be apparent from the following description, a negative coefficient is required for the particular circuit arrangement illustrated. A resistor of the latter type is known as a thermistor.

Resistor R4 and switch S3 are physically located in closed thermal relationship with the most vulnerable component of the generating system, i.e. the first element to fail because of overloading under ordinary operating conditions, to maintain its temperature at a safe level in a manner to be described. Vulnerability is determined largely by three factors, i.e. magnitude of damaging temperature rise, the thermal time constant of the component and temperature rise per unit increase of voltage across or current through the element. Those elements failing at the lowest temperatures and having the shortest time constants are generally the most vulnerable. However, low time constant does not necessarily coincide with low failure temperature and therefore the relative vulnerability of a component depends upon various conditions of operation. Thus the suddenness, duration and magnitude of increases in system voltage or current, depending on whether the component is connected in parallel or series with the load, are important factors, as are air circulation about the component and proximity to other bodies of various temperatures.

In general, I have found that in systems of the type illustrated, the time constant of an element in series with the load is the overriding factor due to the high rates of increase of output current, and thus the most vulnerable components are the series elements with the shortest thermal time constants. In particular, in the system illustrated, the rectifiers 24 and 26 will be found to be the most vulnerable, and therefore resistor R4 and switch S3 should preferably be in thermal contact with these elements.

The operation of my power limiting system is as follows. As the temperature of the vulnerable element approaches the maximum safe limit, thermostatic switch S3 closes, connecting heat-sensitive resistor R4 in parallel with resistor R1, thereby reducing the total resistance in series with voltage sensing coils Ry1 and Ry2. The voltage across the sensing coils thus increases, and the voltage regulators operate in the manner described above to reduce the line voltage to the point where the voltage across the coils is the same as before the closing of the thermostatic switch. The output current, being a function of the line voltage, decreases along with the power dissipation in the rectifiers. Should the temperature of rectifiers 24 and 26 continue to rise after the closing of switch S1, the resistance of resistor R4 will decrease, owing to its negative temperature coefficient, resulting in a further increase in the proportion of the line voltage across the sensing coils Ry1 and Ry2. The voltage regulator will then further decrease the line voltage. Decrease in resistance of resistor R4 and consequent lowering of output voltage will continue as long as the temperature of rectifiers 24 and 26 continues to rise, the negative temperature coefficient of the resistor being sufficient to prevent the temperature from exceeding a safe level.

It will be apparent that with the continuous control afforded by the use of the thermally sensitive resistor R4 the output voltage will be decreased only as much as is necessary to protect the most vulnerable component of the generating system while still operating efficiently. Moreover, full uncompensated output is available until thermostatic switch S3 closes at the point where temperature compensation is desired.

If, after a decrease in voltage due to the compensating action of resistor R4, the temperature of the vulnerable component, e.g. rectifiers 24 and 26, decreases, the resistance of the resistor will increase and the reverse of the above described action will follow. The proportion of the line voltage across the sensing coils Ry1 and Ry2 will decrease, resulting in an increase of the output voltage. Upon further temperature reduction the switch S3 will open, cutting out resistor R4 altogether.

It will be apparent that my novel power limiting circuit is responsive to the condition which actually causes component failure, i.e. high temperature. It automatically takes into account changes in ambient temperature since their effect is in changes in temperature of the most vulnerable component. Thus it allows greater power dissipation in this component at low ambient temperatures. It will be further evident that other voltage regulators than the vibrating type illustrated may be used and that other generating systems may be protected in a like manner.

A further safety factor is added by the parallel arrangement of the resistor R1 and the temperature sensitive element comprising resistor R4 and switch S3. Should either element be short circuited, the proportion of line voltage across the voltage sensing coils Ry1 and Ry2 will increase to 100% and the regulator will decrease the line voltage to a minimum. If the leads to the resistor R1 should open, the line voltage will increase, as will the temperature of the rectifiers 24 and 26, until thermostatic switch S1 closes to bring compensating resistor R4 into the circuit. Assuming that the peak inverse voltage of the rectifiers has not been exceeded complete protection is provided in such case. If the temperature sensitive element open circuits, the voltage regulator will continue to operate, though without compensating for the temperature of the most vulnerable component. Thus essentially complete "fail safe" operation is provided.

Thus, I have described a power limiting system which protects a generating system from failure due to burnout of one of its components. My system reacts to the temperature of the most vulnerable element or elements of the generating system, serving to decrease the generator voltage as the temperature increases and thereby decrease system power output and the electric power dissipation in the component. My system is continuously variable after it begins operation and it adapts the voltage regulation system to existing environmental conditions.

It will thus be seen that the objects set forth above, among those made apparent from the preceding description, are efficiently attained and, since certain changes

I claim:

1. A power dissipation limiting circuit for an electrical generating system comprising, in combination, a voltage regulator adapted to maintain the output voltage of said system below a predetermined level, a thermally sensitive resistor having a negative temperature coefficient, a thermostatic switch adapted to close upon increase in temperature thereof to a desired point, said resistor and said switch being connected in series with said voltage regulator in such manner that an increase in the temperature of said switch and resistor beyond said desired point causes a downward change in the voltage level maintained by said regulator.

2. The combination defined in claim 1 in which said switch and said resistor are in close thermal relationship with the most vulnerable component of said generating system, whereby said voltage regulator maintains the voltage across said output terminals below the level of destructive power dissipation in said component.

3. A power dissipation limiting circuit for a direct-current generating system comprising, in combination, a voltage regulator having a voltage sensing element, said regulator being connected to regulate the output voltage of said system to maintain the voltage applied to said sensing element below a predetermined level, a first resistor connected in series with said voltage sensing element across the output terminals of said generating system, a second resistor having a high temperature coefficient of resistance, a thermally sensitive switch adapted to be actuated when its temperature reaches a desired level, said switch being connected in series with said second resistor, said second resistor and said switch being connected to increase the proportion of said output voltage applied to said voltage sensing element when said switch is actuated by an increase in temperature beyond said desired level and to further increase said voltage proportion upon the change of resistance of said thermally sensitive resistor in response to further increase in the temperature thereof.

4. The combination defined in claim 3 in which said thermally sensitive second resistor and said switch are in close thermal relationship with a vulnerable component of said generating system whereby the output voltage of said system is compensated in accordance with the temperature of said component.

5. A power dissipation limiting circuit for a direct-current generating system comprising, in combination, a voltage regulator having a voltage sensing element, said voltage regulator being adapted to control the output voltage of said system in accordance with the voltage across said sensing element, a first resistor connected in series with said sensing element, means for applying a portion of the output voltage of said system across the series combination of said first resistor and said sensing element, a thermally sensitive second resistor having a negative temperature coefficient of resistance, a thermally sensitive switch adapted to close when its temperature exceeds a desired level, said second resistor and said switch being connected in series across said first resistor, said second resistor and switch being physically located in close thermal relationship to the most vulnerable component of said generating system, whereby upon increase in the temperature of said most vulnerable component to said desired level said switch closes to connect said second resistor in parallel with said first resistor and thereby lower the output voltage of said system, and upon further increase in temperature of said most vulnerable component the resistance of said recond resistor decreases to further lower said output voltage.

6. The combination defined in claim 5 in which said second resistor and said switch are in close thermal relationship with the component of said system having the shortest time constant.

7. The combination defined in claim 5 in which said generating system includes an alternating current generator and rectifiers for rectifying the output of said generator to provide a direct-current output for said system, and in which said second resistor and said switch are in close thermal relationship with said rectifier.

8. A power dissipation limiting circuit for an electrical generating system comprising, in combination, a voltage regulator having a sensing element, means for passing through said sensing element a current which bears a given ratio to the output voltage of said system, whereby said regulator may maintain said output voltage below a predetermined level, a resistor, switching means responsive to the temperature of a component of said system and adapted to operate when said temperature increases beyond a predetermined point, said switching means adapted upon operation thereof to connect said resistor into said circuit in such manner as to increase the ratio of said current to said output voltage at temperatures above said predetermined point, thereby to decrease said predetermined voltage level, said resistor being in thermal conducting relationship with said component and having a substantial temperature coefficient of resistance such as to increase further said ratio as said temperature increases above said predetermined point.

9. The combination defined in claim 8 in which said component is the component of said generating system having the shortest thermal time constant.

10. A power dissipation limiting circuit for an electrical generating system comprising, in combination, a voltage regulator having a pair of sensing terminals, means for applying a proportion of the output voltage of said system to said sensing terminals whereby said regulator is adapted to maintain said output voltage below a predetermined level, a resistor, switching means responsive to the temperature of a vulnerable element of said system and adapted to operate when said temperature increases beyond a predetermined point, said switching means being adapted upon operation thereof to connect said resistor into said circuit in such manner as to increase the proportion of said system voltage applied to said sensing terminals at temperatures above said predetermined point, and thereby to reduce said output voltage, said resistor being in close thermal conducting relationship with said component and having a substantial temperature coefficient of resistance such as to increase further said proportion as said temperature increases above said predetermined point, thereby further to reduce said output voltage of said system.

11. A power dissipation limiting circuit for an electrical generating system having an output voltage at first and second terminals, said circuit comprising, in combination, a voltage regulator having third and fourth terminals, means for applying a proportion of the output voltage at said first and second terminals across said third and fourth terminals, said regulator being adapted to maintain the voltage across said third or fourth terminals below a predetermined level, a thermally sensitive resistor located in thermal relationship with a vulnerable component in said system, means adapted to connect said resistor between said first and second terminals when the temperature of said component reaches a predetermined point, in such manner as to increase the proportion of said system voltage across said third and fourth terminals, thereby to decrease said system output voltage, the temperature coefficient of resistance of said resistor being such as to increase further said proportion upon further increase of said component temperature above said predetermined point, thereby to reduce further said system voltage and prevent burn-out of said component.

References Cited in the file of this patent

UNITED STATES PATENTS

| | | |
|---|---|---|
| 1,094,733 | Lyle | Apr. 28, 1914 |
| 1,976,404 | Leingang | Oct. 9, 1934 |
| 2,421,523 | Rady | June 3, 1947 |